(12) United States Patent
Shatdal

(10) Patent No.: US 8,046,394 B1
(45) Date of Patent: Oct. 25, 2011

(54) DYNAMIC PARTITIONING FOR AN ORDERED ANALYTIC FUNCTION

(75) Inventor: Ambuj Shatdal, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 326 days.

(21) Appl. No.: 12/277,580

(22) Filed: Nov. 25, 2008

(51) Int. Cl.
*G06F 17/30* (2006.01)

(52) U.S. Cl. ................................. 707/968; 707/E17.054

(58) Field of Classification Search .................. 707/968, 707/972, E17.054
See application file for complete search history.

(56) References Cited

U.S. PATENT DOCUMENTS

| | | | |
|---|---|---|---|
| 5,867,686 A * | 2/1999 | Conner et al. ................ | 711/168 |
| 6,192,358 B1 | 2/2001 | Fuh | |
| 6,505,187 B1 | 1/2003 | Shatdal | |
| 6,789,252 B1 * | 9/2004 | Burke et al. .................. | 717/100 |
| 6,816,853 B1 | 11/2004 | Agarwal | |
| 6,931,395 B2 * | 8/2005 | Day et al. .............................. | 1/1 |
| 7,020,661 B1 * | 3/2006 | Cruanes et al. ........................ | 1/1 |
| 7,167,878 B2 * | 1/2007 | Chan et al. ............................ | 1/1 |
| 7,385,924 B1 * | 6/2008 | Riddle ......................... | 370/235 |
| 7,681,011 B1 * | 3/2010 | Shmuylovich et al. ........ | 711/173 |
| 7,779,008 B2 | 8/2010 | Dageville | |
| 2002/0032676 A1 | 3/2002 | Reiner | |
| 2006/0190947 A1 | 8/2006 | Ghosh | |
| 2007/0078813 A1 | 4/2007 | Beavin | |
| 2007/0078826 A1 | 4/2007 | Bozkaya | |

OTHER PUBLICATIONS

A. Shatdal, "Order Based Analysis Functions in NCR Teradata Parallel RDBMS," EDBT 2000, LNCS 1777, pp. 219-223 (2000).
U.S. Appl. No. 12/731,787, Office Action dated Sep. 23, 2010, pp. 1-9 and attachment.

* cited by examiner

*Primary Examiner* — Leslie Wong
(74) *Attorney, Agent, or Firm* — Trop, Pruner & Hu P.C.

(57) ABSTRACT

In a database system, a query to perforin an ordered analytic function is received. The query contains a clause specifying creation of dynamic partitions, where the clause contains a partitioning condition to specify the dynamic partitions. During processing of the query, the dynamic partitions are identified based on evaluating the partitioning condition.

19 Claims, 4 Drawing Sheets

| ACCT | MONTH_NUM | BALANCE | ROW_NUMBER |
|---|---|---|---|
| 1 | 1 | 60 | 1 |
| 1 | 2 | 99 | 2 |
| 1 | 3 | 94 | 1 |
| 1 | 4 | 90 | 1 |
| 1 | 5 | 80 | 1 |
| 1 | 6 | 88 | 2 |
| 1 | 7 | 90 | 3 |
| 1 | 8 | 92 | 4 |
| 1 | 9 | 10 | 1 |
| 1 | 10 | 60 | 2 |
| 1 | 11 | 80 | 3 |
| 1 | 12 | 10 | 1 |

Rows 1-2: 102; row 3: 104; row 4: 106; rows 5-8: 108; rows 9-11: 110; row 12: 112.

FIG. 1

DYNAMIC PARTITIONING FOR AN ORDERED ANALYTIC FUNCTION

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can be issued to insert new entries into a table of a database (such as to insert a row into the table), modify the content of the table, or to delete entries from the table. Examples of SQL statements include INSERT, SELECT, UPDATE, and DELETE.

In a relational database management system, ordered analytic functions are often used, where an ordered analytic function refers to a function that contains an order specification (specifying an order based on one or more attributes, e.g., sorting based on the one or more attributes) or an expression that performs some predetermined analysis, such as ranking, computing a moving average within some window size, calculating a cumulative total, calculating a percentile, and so forth.

SQL defines a PARTITION BY clause that allows such ordered analytic functions to be computed on multiple distinct partitions of the data determined by the value of one or more columns contained in the PARTITION BY clause. However, the partitions defined by the PARTITION BY clause are static partitions, which provide relatively limited flexibility.

SUMMARY

In general, according to an embodiment, a query to perform an ordered analytic function contains a clause specifying creation of dynamic partitions, where the clause contains a partitioning condition to specify the dynamic partitions.

Other or alternative features will become apparent from the following description, from the drawings, and from the claims.

BRIEF DESCRIPTION OF THE DRAWINGS

FIG. 1 illustrates an exemplary output provided by a query according to an embodiment.

DETAILED DESCRIPTION

Figure 2:
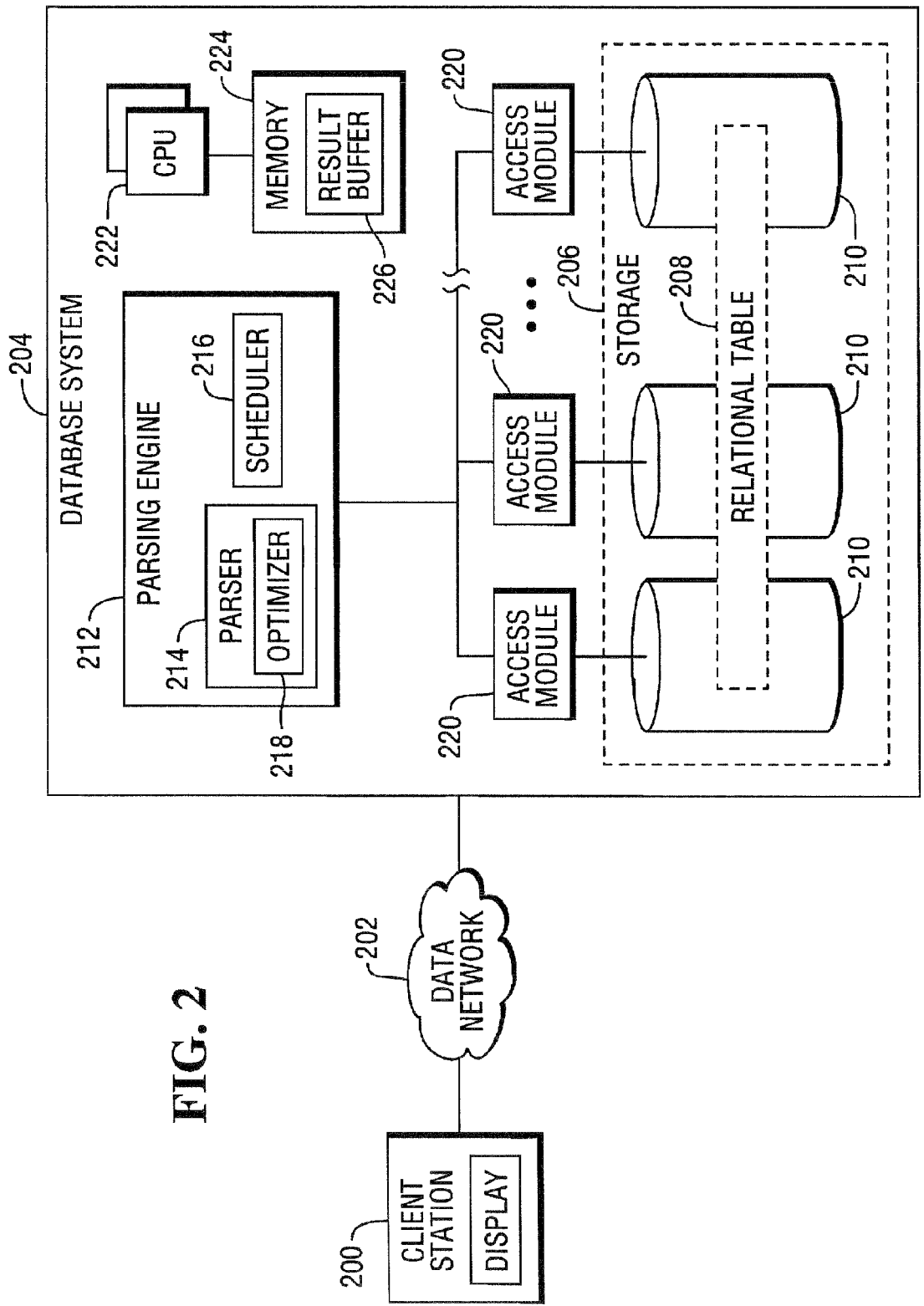
FIG. 2 is a block diagram of an exemplary database system in which an embodiment of the invention can be incorporated.

A technique according to some embodiments enables the performance of ordered analytic functions with dynamic partitioning. The technique involves the use of database queries to perform the ordered analytic functions, where such queries contain clauses that specify creation of dynamic partitions. Each clause for specifying creation of dynamic partitions contains a partitioning condition that when evaluated to true identifies a corresponding dynamic partition.

The partitioning condition can be based on any column that can be present in a Structured Query Language (SQL) query, such as the SELECT statement. Whenever the partitioning condition is evaluated to true, then a new partition is created and the ordered analytic function computation proceeds on the new partition. In processing the query containing the dynamic partition clause, the partitioning condition typically will evaluate to true multiple times to produce multiple corresponding dynamic partitions.

The following is an exemplary SQL SELECT statement for performing an ordered analytic function with dynamic partitioning:

```
SELECT ACCT, MONTH_NUM, BALANCE,
   ROW_NUMBER( ) OVER
      (PARTITION BY ACCT
      ORDER BY MONTH_NUM
      RESET WHEN BALANCE /* current row balance */ <=
         SUM(BALANCE) over (ORDER BY MONTH_NUM
         ROWS BETWEEN 1 PRECEDING AND 1 PRECEDING)/*
prev row */)
FROM ACCT_BALANCE;
```

In the exemplary query above, the columns (or attributes) of table ACCT_BALANCE selected for output are ACCT, MONTH_NUM, and BALANCE. The function ROW_NUMBER( ) is an example window function that is a counting function to count the number of times that the balance within a current dynamic partition has increased from month to month. In other examples, the ROW_NUMBER( ) function can be replaced with a sum function or other window function. The order specification in the query is provided by the ORDER BY clause. The desired analysis specified by the query is to find a pattern of increasing balances over consecutive months for specified accounts (as represented by the ACCT attribute), where this analysis is performed by the ROW_NUMBER( ) in conjunction with the RESET WHEN clause. The PARTITION BY clause in the example query above defines static partitions based on account numbers represented by the ACCT attribute. In other words, the PARTITION BY clause causes a static partition to be created based on changes in value of the ACCT attribute in the ACCT_BALANCE table.

The ORDER BY clause orders the rows according to month numbers (MONTH_NUM attribute). The RESET WHEN clause, which is part of the ordered analytic function specification, specifies the partitioning condition for identifying dynamic partitions. In this case, a new dynamic partition is identified when the following partitioning condition evaluates to true: the balance of the current row being processed (as represented by the BALANCE attribute) is less than or equal to the previous month's balance (as represented in the previous row, assuming that the ordering specified by the ORDER BY clause has been performed). In the example query above, the RESET WHEN clause defines the dynamic partitions, while the ROW_NUMBER( ) function is computed to produce a result that is output.

An exemplary output of the query above is depicted in FIG. 1. The rows in the output represent rows that have been sorted by the ACCT attribute and the MONTH_NUM attribute. In the example of FIG. 1, just one account number is depicted, the account number "1". Other account numbers (not shown) would be specified after all the rows for account number "1" has been listed. The last column of the result in FIG. 1 contains the output of the ROW_NUMBER( ) function.

As specified by the exemplary query above, a new dynamic partition is identified when the balance of a current row is less than the balance of the previous row. Thus, for example, a new dynamic partition 104 (after dynamic partition 102) is identified because the BALANCE value in the row corresponding to dynamic partition 104 is less than the BALANCE value of the previous row. The remaining dynamic partitions 106, 108, 110, and 112 in the example of FIG. 1 are identified in similar fashion.

Note that dynamic partitions 102, 108, and 110 each has multiple rows, and thus, the ROW_NUMBER( ) count maintained for each of the dynamic partitions 102, 108, and 110 start at one and increments for each subsequent row in the partition.

The exemplary query discussed further above includes a PARTITION BY clause, which defines static partitioning. However, such a static partitioning clause does not have to be used, and an equivalent query (without a PARTITION BY clause) can be specified as follows:

```
SELECT ACCT, MONTH_NUM, BALANCE,
  ROW_NUMBER( ) OVER
    (ORDER BY ACCT, MONTH_NUM
    RESET WHEN BALANCE /* current row balance */ <=
      SUM(balance) over (ORDER BY ACCT, MONTH_NUM
      ROWS BETWEEN 1 PRECEDING AND 1 PRECEDING)/* prev row
*/ OR
      ACCT /* current acct */ <>
      SUM(ACCT) OVER (ORDER BY ACCT, MONTH_NUM
      ROWS BETWEEN 1 PRECEDING AND 1 PRECEDING) /* prev acct
*/ )
FROM ACCT_BALANCE;
```

FIG. 1 provides an example in which patterns of increasing balances can be depicted for convenient understanding.

FIG. 2 illustrates an exemplary arrangement in which a client station (or plural client stations) 200 is (are) coupled to a database system 204 over a data network 202. Examples of the data network 202 include a local area network (LAN), a wide area network (WAN), the Internet, and so forth. Each client station 200 is capable of issuing queries according to a standard database query language to the database system 204 to access or update data or to create or alter data structures (e.g., tables, databases, views, and so forth). One example of a standard database query language is SQL, as promulgated by the American National Standards Institute (ANSI).

The database system 204 includes a storage subsystem 206 that stores various data, including relational tables 208. Each relational table 208 contains rows and columns. The storage subsystem 206 includes plural storage modules 210, which can be physical storage devices or logical representations of partitions of the storage subsystem 206.

The database system 204 also includes a parsing engine 212, which has a parser 214 and a scheduler 216. The parser 214 receives database queries (such as those submitted by the client stations 200), parses each received query, and generates executable steps for the parsed query. The parser 214 includes an optimizer 218 that generates query plans in response to a query, selecting the most efficient from among the plural query plans. The scheduler 216 sends the executable steps generated by the parser 214 to multiple access modules 220 in the database system 204.

Each access module 220 performs the following tasks: inserts, deletes, or modifies contents of tables; creates, modifies, or deletes definitions of tables; retrieves information from definitions and tables; and locks databases and tables. In one example, each access module 220 is based on an access module processor (AMP) used in some TERADATA® database systems from Teradata Corporation. Each access module 220 manages access of data in respective storage modules 210. The presence of multiple access modules 220 and corresponding storage modules 210 define a parallel database system. In alternative embodiments, instead of database systems having multiple access modules, a database system with only one access module can be employed.

The access modules 220 and parsing engine 212 are part of the database software executable in the database system 204. The database software is executable on one or more central processing units (CPUs) 222 of the database system 204. The CPU(s) 222 is (are) connected to a memory 224.

In the example of FIG. 2, the components of the database system 204 are depicted as being part of one node. Note that the database system 204 can actually be implemented in a multi-node system, where each node contains one or more access modules 220 and parsing engines 212 to provide a distributed database architecture.

Alternatively, instead of a parallel or multi-processing system as depicted in FIG. 2, a uni-processor system can be provided.

One type of query that can be received by the database system 204 is a query for performing an ordered analytic function and that contains a clause that specifies dynamic partitioning, in accordance with some embodiments. The parsing engine 212 is able to perform tasks in response to receipt of such a query.

Figure 3:
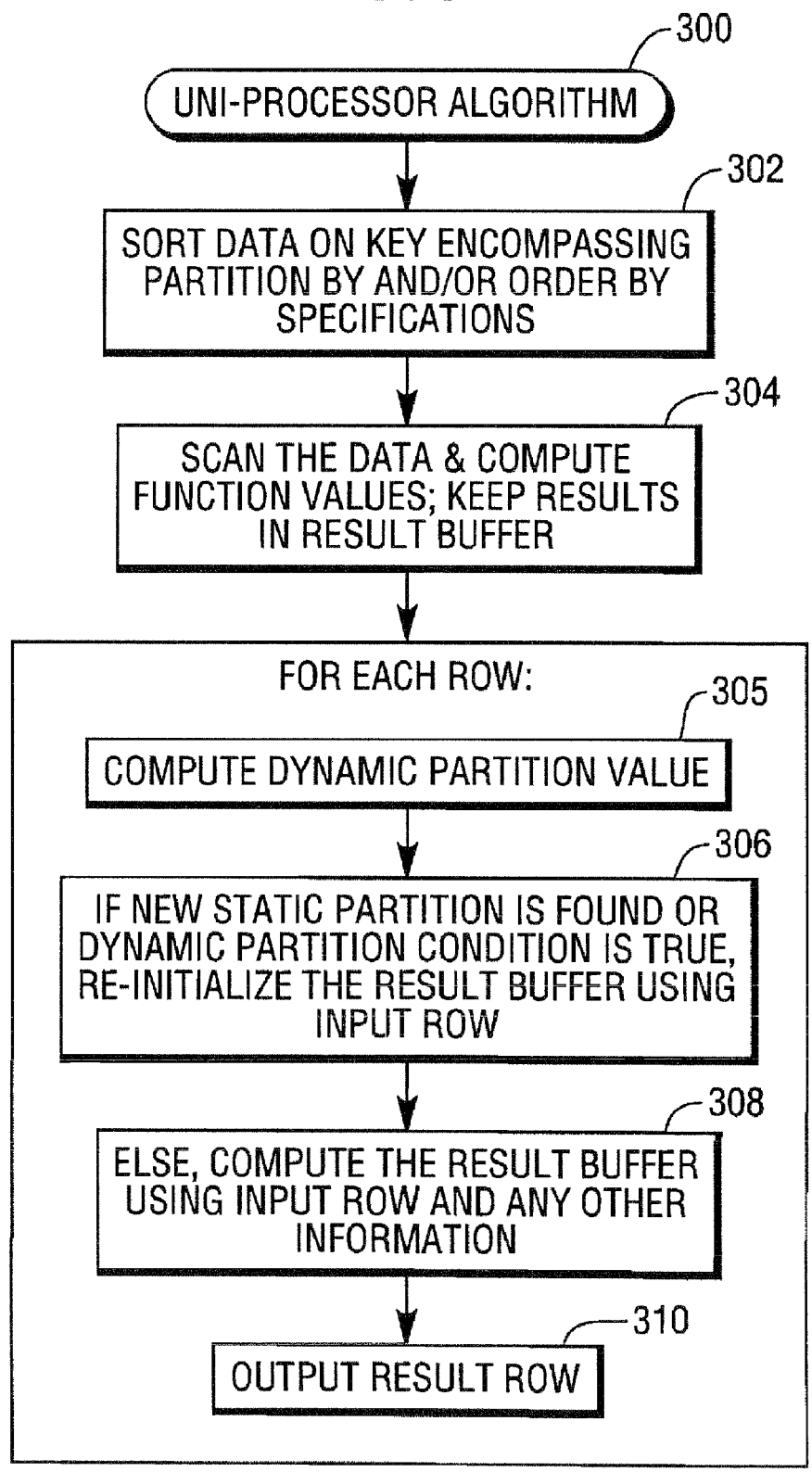
FIG. 3 is a flow diagram of a process of performing an ordered analytic function with dynamic partitioning, using a uni-processing algorithm, according to an embodiment.

FIG. 3 shows a uni-processor algorithm 300 for processing a query that performs an ordered analytic function with dynamic partitioning. The uni-processor algorithm 300 is executed by the database software, including the parsing engine 212 and an access module 220 of FIG. 1. The data that is the subject of the processing is from input rows of a table specified by the query (e.g., table ACCT_BALANCE in the exemplary queries above).

The uni-processor algorithm 300 first sorts (at 302) the input data on a key that encompasses the PARTITION BY and/or ORDER BY specifications. For example, in the first exemplary query provided above, the PARTITION BY specification includes the ACCT attribute (of the table ACCT_BALANCE), and the ORDER BY specification contains the MONTH_NUM attribute. Thus, in the example above, the rows of the input table are sorted by the ACCT attribute and MONTH_NUM attribute. Such sorting is illustrated in the FIG. 1 example depicted above.

After sorting, the data is then scanned (at 304) and function values are computed. The function values refer to various expressions that are contained in the input query, such as the SUM(BALANCE) function, and the expression for computing values of ROW_NUMBER( ) provided in the exemplary query above. The content of such expressions are stored in a result buffer 226 contained in the memory 224 of the database system 204.

Next, each input row is processed one at a time, in consecutive order. For each row, the dynamic partition condition value is computed (at 305). In the example above, the dynamic partition condition is provided by the RESET WHEN clause. If a new static partition is found (based on the PARTITION BY clause) or the dynamic partition condition is evaluated to true, then the result buffer 226 is re-initialized (at 306) using the input row. Re-initializing can refer to resetting the value of ROW_NUMBER( ), for example, or to any other type of re-initialization that has to be performed based on the specific application.

If no new static partition is found and the dynamic partition condition evaluates to false, then the result buffer is computed (at 308) using the input row and any other information. Computing the result buffer at 308 refers to adding to the result buffer, and in the context of the exemplary queries above, incrementing the value of ROW_NUMBER( ). Other information can refer to any other information that may be needed to update information in the result buffer.

The result row is then output (at 310). In FIG. 1, each result row can be any of the single rows depicted that includes the following attributes: ACCT, MONTH_NUM, BALANCE, ROW_NUMBER( ).

Processing a query for an ordered analytic function with dynamic partitioning can also be performed in the context of a parallel processing system, such as the parallel processing system depicted in FIG. 2. With the parallel processing algorithm, two situations are addressed:

(1) data is to be hash partitioned on the static PARTITION BY specification (or does not need partitioning); and
(2) data is to be range (value) partitioned on the composite key encompassing PARTITION BY and ORDER BY specifications.

Hash partitioning refers to applying hash functions on specified one or more columns of the static PARTITION BY specification to produce hash values which are then used to redistribute data among multiple access modules (e.g., access module 220 of the parallel database system). In this scenario, the processing on each access module 220 is the same as in the uni-processor case. In other words, each access module 220 is able to perform the ordered analytic function with dynamic partitioning without considering the result of the ordered analytic partitioning with dynamic partitioning performed by other access modules.

The uni-processor algorithm 300 can also be used in the situation where no partitioning of data is needed (in other words, the data has already been pre-partitioned) across the multiple access modules 220.

It is also noted that for ordered analytic functions with fixed window sizes, such as moving aggregation functions, the processing also remains the same as the uni-processor algorithm described above.

On the other hand, if range partitioning is used with an unbounded window, such as for rank or cumulative-type functions, then the uni-processor algorithm cannot be applied without modification. Range partitioning refers to redistributing rows of a table across multiple access modules according to values of a predetermined attribute (or attributes). For example, a first range is associated with a first access module (rows containing the attribute having values in the first range are redistributed to the first access module), a second range is associated with a second access module, and so forth.

Figure 4:
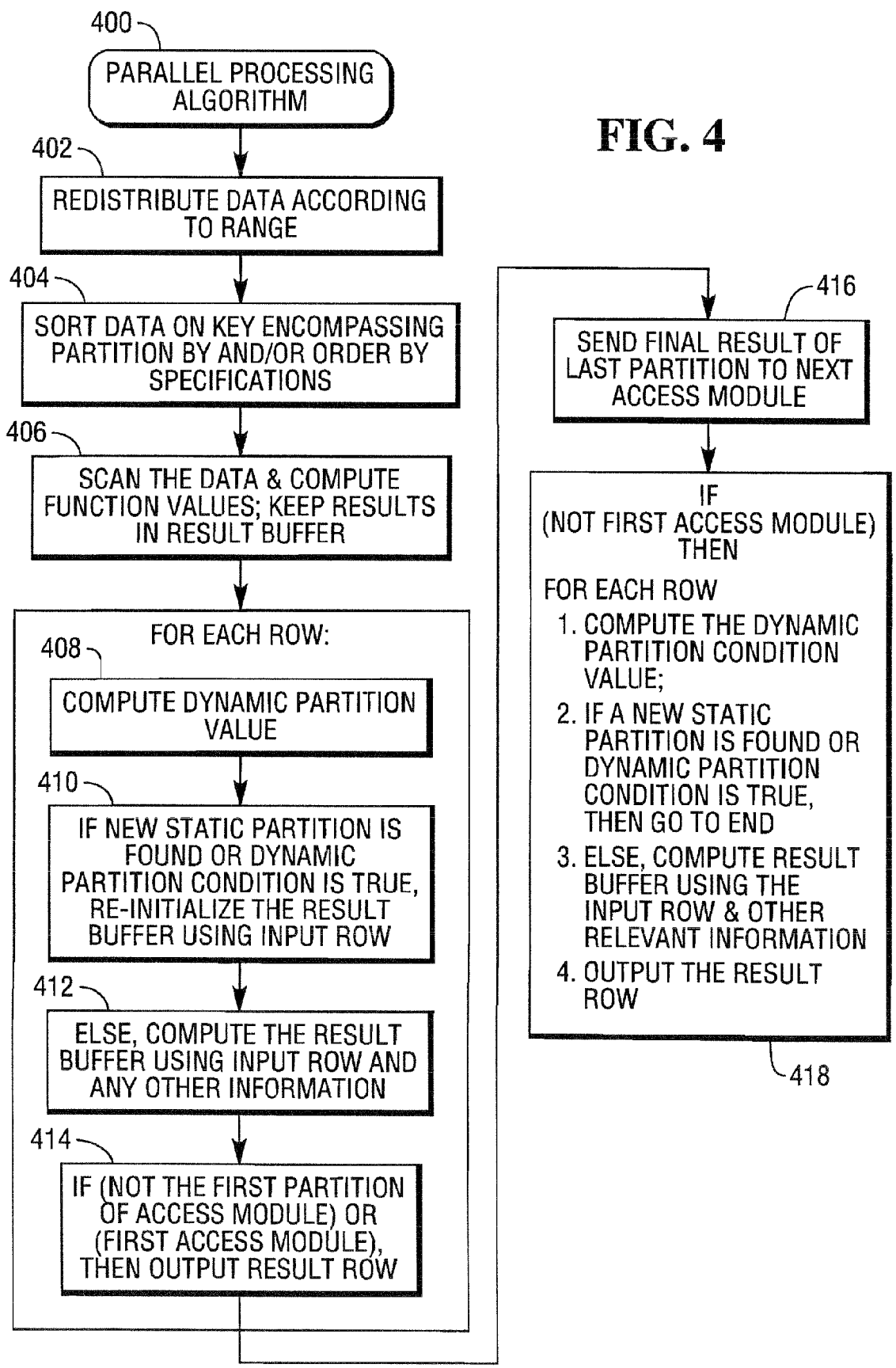
FIG. 4 is a flow diagram of a process of performing an ordered analytic function with dynamic partitioning, using a parallel processing algorithm, according to a further embodiment.

In the above scenario, a parallel processing algorithm 400 according to FIG. 4 is used. First, the data is redistributed (at 402) across the access modules 220 according to which range the composite key encompassing the PARTITION BY and/or ORDER BY specifications falls within. The composite key refers to the combination of keys (assuming multiple keys) contained in the PARTITION BY and/or ORDER BY specifications. After redistribution of data, no aggregation has to be performed at this point, yet.

Next, the processing according to tasks 404, 406, 408, 410, 412, and 414 are performed in each access module, and the tasks 404, 406, 408, 410 and 412 are the same as task 302, 304, 305, 306, and 308, respectively, in FIG. 3.

In the parallel processing algorithm 400, when range partitioning is used and an unbounded window is specified, then coordination would have to be performed between different access modules since the last dynamic partition of one access module may continue into the first partition of the next access module. In some embodiments, this coordination is accomplished by access module i sending the result of its final partition to the next access module i+1.

Thus, according to task 414 of the FIG. 4, the result row from the processing performed at 408, 410, and 412 is output only if the processing is performed at the first access module (since there are no other access modules that would send its result to the first access module) or if the output result row is not part of the first partition of the access module (since the first partition can potentially overlap with the last partition of the previous access module).

After all the rows have been processed, the final result of the last partition is sent (at 416) from access module i to access module i+1 (at 416).

Next, task 418 is performed at each access module other than the first access module. Task 418 basically performs some of the processing performed at 408, 410, 412, for the first partition of each access module other than the first access module. Task 418 includes computing a dynamic partition condition value. Also, task 418 includes determining if a new static partition is found or the dynamic partition condition is evaluated to true; if so, then the task 418 ends. If a new static partition is not found or the dynamic partition condition does evaluate to true, then the result buffer is computed using the input row and any other relevant information.

Note that the first partition of an access module is empty if the dynamic partition condition is true for the very first row (in other words, a new dynamic partition starts at the beginning of the input of the access module).

Instructions of software (e.g., database software) described above are loaded for execution on a processor (such as CPUs 222 in FIG. 2). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer system, comprising:
receiving a query to perform an ordered analytic function, wherein the query contains a clause specifying creation of dynamic partitions, wherein the clause contains a partitioning condition to specify the dynamic partitions, and wherein receiving the query comprises receiving a Structured Query Language (SQL) query; and
during processing of the query, identifying the dynamic partitions based on evaluating the partitioning condition, wherein processing the query comprises:
redistributing input data across plural access modules;

after redistributing, performing at each of the plural access modules:
sorting the input data according to at least one attribute specified in a clause in the query that specifies ordering of the input data; and
identifying the dynamic partitions in the sorted input data.

2. The method of claim 1, wherein receiving the query comprises receiving the query that further contains a clause to specify static partitions in addition to the clause specifying creation of dynamic partitions.

3. The method of claim 2, wherein the clause to specify static partitions comprises a PARTITION BY clause.

4. The method of claim 2, wherein the clause to specify creation of dynamic partitions comprises a RESET WHEN clause.

5. The method of claim 2, wherein the query selects attributes to output as a result of the processing of the query, and wherein the query further specifies a table that contains the attributes.

6. The method of claim 1, wherein identifying the dynamic partitions based on evaluating the partitioning condition comprises identifying the dynamic partitions based on computing true values of the partitioning condition.

7. The method of claim 1, wherein the query contains a function, the method further comprising computing values of the function in each dynamic partition.

8. The method of claim 7, further comprising outputting the values along with other attributes specified by the query.

9. The method of claim 1, wherein processing the query comprises performing a parallel processing algorithm using the plural access modules.

10. The method of claim 9, wherein processing the query comprises sending a result of one access module to another access module.

11. The method of claim 1, wherein the query selects attributes to output as a result of the processing of the query, and wherein the query further specifies a table that contains the attributes.

12. An article comprising at least one computer-readable storage medium containing instructions that when executed cause a database system having a processor to:
receive a query to perform an ordered analytic function, wherein the query contains a clause specifying creation of dynamic partitions, and wherein the clause contains a partitioning condition to specify the dynamic partitions; and
during processing of the query, identify the dynamic partitions based on evaluating the partitioning condition, wherein processing the query comprises:
redistributing input data across plural access modules;
after redistributing, performing at each of the plural access modules:
sorting the input data according to at least one attribute specified in a clause in the query that specifies ordering of the input data; and
identifying the dynamic partitions in the sorted input data.

13. The article of claim 12, wherein the ordered analytic function contains at least one expression that specifies ordering based on at least one attribute.

14. The article of claim 12, wherein processing the query comprises sending data from a last dynamic partition of one access module to a first dynamic partition of a next access module.

15. A database system comprising:
a processor; and
database software executable on the processor to:
receive a Structured Query Language (SQL) query to perform an ordered analytic function, wherein the query contains a clause specifying creation of dynamic partitions, and wherein the clause contains a partitioning condition to specify the dynamic partitions; and
during processing of the query, identify the dynamic partitions based on evaluating the partitioning condition, wherein processing the query comprises:
redistributing input data across plural access modules;
after redistributing, performing at each of the plural access modules:
sorting the input data according to at least one attribute specified in a clause in the query that specifies ordering of the input data; and
identifying the dynamic partitions in the sorted input data.

16. The database system of claim 15, wherein the query further contains a clause to specify static partitions in addition to the clause specifying creation of dynamic partitions.

17. The database system of claim 15, wherein the dynamic partitions are identified based on computing true values of the partitioning condition.

18. The database system of claim 15, wherein the query selects attributes to output as a result of the processing of the query, and wherein the query further specifies a table that contains the attributes.

19. A database system comprising:
a processor; and
database software executable on the processor to:
receive a query to perform an ordered analytic function, wherein the query contains a clause specifying creation of dynamic partitions, and wherein the clause contains a partitioning condition to specify the dynamic partitions; and
during processing of the query, identify the dynamic partitions based on evaluating the partitioning condition, wherein processing the query comprises:
redistributing input data across plural access modules;
after redistributing, performing at each of the plural access modules:
sorting the input data according to at least one attribute specified in a clause in the query that specifies ordering of the input data; and identifying the dynamic partitions in the sorted input data.

* * * * *